United States Patent Office 2,856,816
Patented Oct. 21, 1958

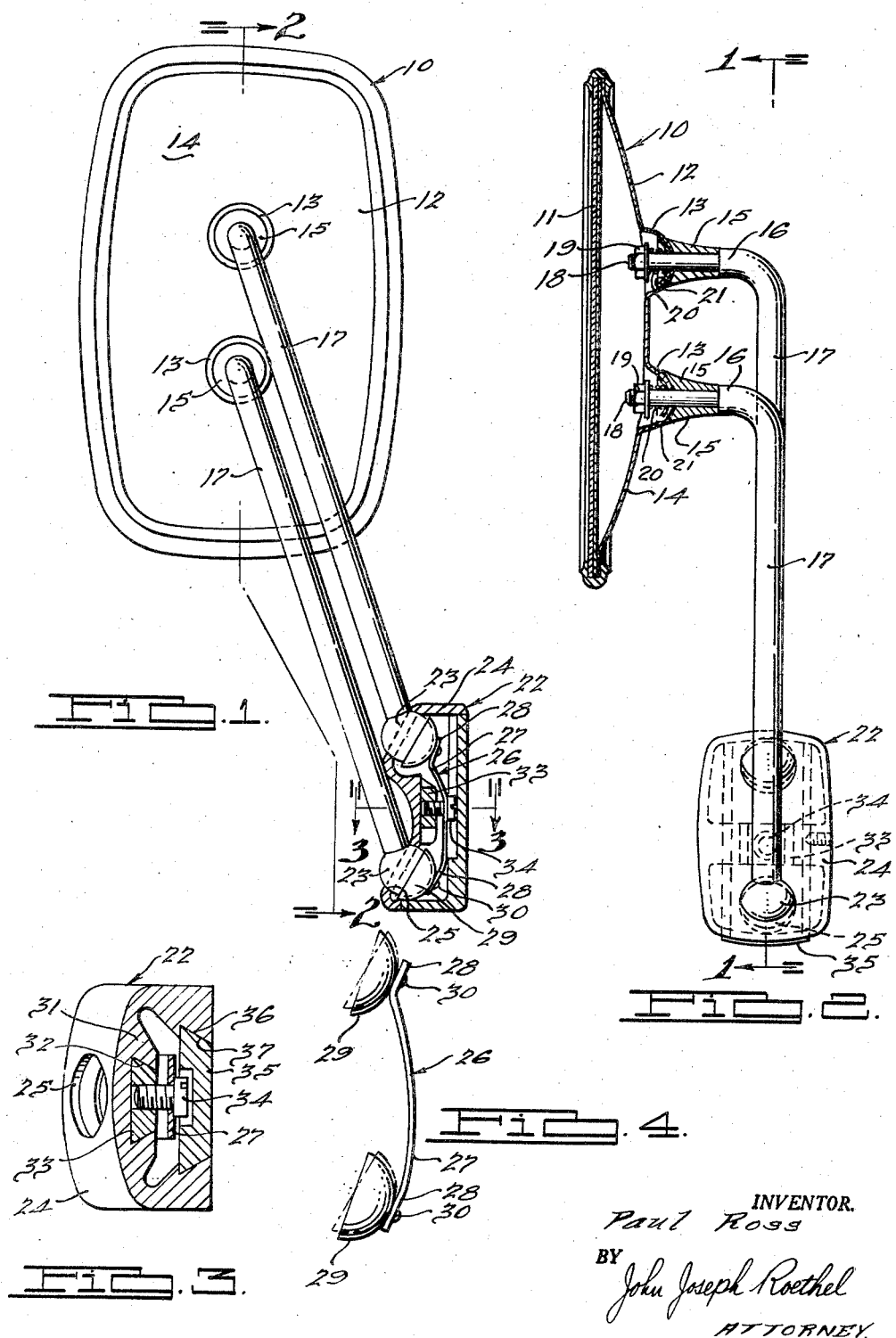

2,856,816

REAR VIEW MIRROR MOUNTING MEANS

Paul Ross, Wuppertal-Langerfeld, Germany, assignor to Gebruder Happich-Gesellschaft mit beschrankter Haftung, Wuppertal-Elberfeld, Germany Application March 21, 1955, Serial No. 495,628

Claims priority, application Germany August 9, 1954

3 Claims. (Cl. 88—98)

This invention relates to a rear view mirror mounting means and more particularly to a mounting means for a heavy duty rear view mirror such as is mounted exteriorly of a truck cab or motor bus body.

It is indispensable that a rear view mirror mounted exteriorly of a vehicle body be mounted on articulated support members. Such articulation permits the driver to adjust the mirror to provide full vision regardless of his height or the relative height of his eye level above the road. However, the conventional articulated mounting of the mirror on the vehicle body is subject to the disadvantage that the vibration of the vehicle body during transit over a highway frequently is transmitted to the articulated mounting and results in the mirror changing position.

The conventional method of preventing such shifting of the mirror, or, in effect, ensuring the binding of the articulated support members against movement under the most adverse conditions anticipated, is to increase the friction of the connecting joints either by providing large radii ball and socket joints or by providing an increased friction coefficient of the working surfaces of such joints. The utility of either of these two methods is questionable. The use of large radii ball and socket joints results in a clumsy and expensive articulation, and increasing the friction coefficient of the surfaces results in rapid wear of the joints. In the latter case, frequent repairs will be required. For example, one method of increasing the friction coefficient of the working surfaces is to interpose brake facing in the joint. However, from usage the friction coefficient of the brake facing will change because of the gradual chamfering or wearing down of the brake facing and replacement thereof will be required. In addition, there is the risk that even if the articulated joints are designed to be water tight, condensation will form inside the joints therefore affecting the adhesion of the brake facing to the opposed working surface.

Further, with a conventional mirror mounting it is necessary to provide a mirror as small as possible to minimize the weight thereof and to minimize the area against which wind caused by movement of the vehicle may act. As it serves to increase the safety on the road if the rear view mirror be so constructed that it reflects as large an area behind the vehicle as possible, mirrors having a convex surface were designed to compensate for the smallness of size. Unfortunately, such convex mirrors produce a distorted image.

It is an object of the present invention to overcome the disadvantages of conventional mirror mounting systems and thereby obviate the perils of road traffic resulting from an unreliable rear view mirror. It is thus an object to provide a mirror mounting means which will permit ready manual adjustment of the mirror while retaining the same in adjusted position even under the most adverse conditions of usage.

The objective of the present invention has been achieved by supporting the mirror on the vehicle body mounting bracket by means of two rods acting in parallelogram fashion. The parallelogram support rods or members doubles the friction in the articulations or joints at both the mirror body member and at the vehicle body mounting bracket while permitting easy manual adjustment of the mirror and secure retention thereof in adjusted position. The parallelogram support members permit a large size mirror to be used which is capable of reflecting, to the driver's advantage, a larger area of the roadway behind the vehicle. The support rods may be hollow thus lowering their weight.

In conventional articulated mirror supporting devices in which a single arm or guiding device is used to support the mirror, the ball element at the end of the arm opposite the mirror is bedded in a half-ball socket, the latter being pressed by spring means to the ball to secure the necessary degree of friction. In carrying out the present invention, wherein two ball and socket joints are provided, it is an object to provide a single or common plate-spring effective to exert the necessary pressure on both ball and socket joints. However, it has been found that the pressure exerted by a single or common plate-spring on two ball sockets, when each end of the spring merely lies in abutting relation to a ball socket, is not effective to maintain the balls and sockets in proper frictional engagement, the common plate-spring being irregularly deflected when pressure is exerted thereon. It is an object of the present invention to provide a system wherein the ball sockets are connected to the ends of a plate spring in such a way that the ball sockets have a free movement in all directions, much in the nature of a universal joint, but are maintained in effective relationship to the spring ends. Thus, when the spring is extended or shortened by a change of its pressure exerting influence, whereby in each case the distance between the two fastening points of the ends of the spring changes, the ball sockets can always adapt themselves to a new position owing to their ability to act in the nature of universal joints.

Further, it is an object to provide a construction and arrangement wherein the spring with the ball sockets connected thereto while exerting pressure or even when being released from exerting pressure, can adjust itself bodily relatively to the balls. Accordingly, provision is made for the nut, which nut coacts with a screw provided for adjusting the pressure exerted by the spring and for holding the spring in place, to be held in a guideway extending in the longitudinal direction of the longitudinal axis of the spring so as to permit movement of the nut in such direction. Thus, the spring is able to bodily adjust itself so as to be always substantially centrally located between the balls.

Other objects, advantages and features of the construction will appear in the following description and appended claims, reference being had to the accompanying drawing forming a part of the specification wherein like reference characters designate corresponding parts in the several views.

Fig. 1 is a rear elevational view of the mirror and mounting means therefor, the mounting means being shown in part sectional, the view being taken substantially along line 1—1 of Fig. 2 looking in the direction of the arrows.

Fig. 2 is a side elevational view in part sectional of Fig. 1 taken along the line 2—2 of Fig. 1 looking in the direction of the arrows.

Fig. 3 is a sectional view taken substantially through line 3—3 of Fig. 1 looking in the direction of the arrows.

Fig. 4 is an enlarged view showing in detail the construction and arrangement of the spring and the half ball socket members mounted threeon.

This application is a continuation-in-part of my copending application, Serial No. 415,087, filed March 9, 1954.

Before explaining in detail the present invention it is to be understood that the invention is not limited in its application to the details of construction and arrangements of parts illustrated in the accompanying drawings, since the invention is capable of other embodiments and of being practiced or carried out in various ways. Also it is to be understood that the phraseology or terminology employed herein is for the purpose of description and not of limitation.

In the drawing there is illustrated, by way of example, an embodiment of the present invention as it would appear when mouned on a vehicle body. The mirror device, generally designated 10, comprises a mirror glass 11 mounted in a body member 12 having two spaced semi-spherical nodes 13 formed on the rear surface 14 thereof. The nodes 13 are seated in socket members 15 secured to the end 16 of two rods 17. The rod ends 16 are parallel to each other and angularly related to their respective rods 17. The nodes 13 are adjustably maintained in the socket members 15 by securing devices. It will be noted that each rod end 16 is provided with a stud portion 18 threaded to receive nuts 19. Each stud portion 18 carries a compression spring 20 for exerting pressure on a curved washer 21 engaging the inner surface of the node 13. It will be apparent that the tension on the springs 20 may be varied by adjustment of the respective nuts 19.

The rods 17 are maintained in normally upstanding parallel relationship through the pressure means housed in a bracket means 22 adapted to be secured to the exterior of the vehicle body. The rods 17 at their lower ends are provided with ball shaped enlargements 23. The enlargements 23 are substantially contained within a housing 24 forming part of the bracket means 22, the housing 24 being provided with circular apertures 25 through which the rods 17 project. It will be understood the rods 17 are passed through the respective apertures 25 prior to the fastening of the mirror body member 12 to the free ends 16 thereof. The apertures 25 are slightly smaller in diameter than the major diameters of the ball enlargements 23 on the rods 17. The rods 17 are maintained in desired position by frictional engagement of the surfaces of the ball enlargements 23 with the edge walls of the apertures 25. A spring pressure exerting means, generally designated 26, is provided to hold the ball enlargements 23 in the required engagement with the edge walls of the apertures 25.

As most clearly seen in Fig. 4, the spring device 26 comprises a leaf or plate-spring 27 having parallelly extending extensions 28 at each end thereof. The extensions have mounted thereon ball sockets 29. The ball sockets 29 are semi-spherical in shape and loosely riveted to the spring ends 28 by rivets 30. The loose riveting permits the ball sockets 29 to swivel freely in all directions to an extent sufficient to accommodate variations in the length of the plate-spring 27. Such variations in spring length occurs when it is desired to adjust the tension thereof and also when manual pressure is exerted on the mirror supporting rod 17 to change the position of the mirror device 10.

Referring to Figs. 1 and 3, the mounting of the spring device 26 within the housing 24 is illustrated in the sectional views. The housing is provided with a center portion 31 having a vertically extending dovetail formed groove 32 therein. The dovetail groove slidably receives a special nut 33 therein, the nut 33 receiving a cap-screw 34 which is passed through an aperture in the spring 27. It will be apparent that tension on the spring 27 may be varied by adjustment of the screw 34. The nut 33 being slidable within the groove 32 permits the spring 27 to bodily shift to a neutral position in which any stress on the ends thereof resulting from repositioning of the support rods 17 is equalized. The ball sockets 29 being swivelly mounted further ensures equalization of pressure on the ball enlargements 23. The swivel mounting of the ball sockets 29 permits them to self-adjust themselves to exert pressure on the ball enlargements 23 in the most effective direction regardless of any change in the effective length of the spring resulting from adjustment of the adjustment screw 34.

The housing 24 is slidably retained on the vehicle body by engagement thereof with a mounting plate 35 pre-fastened to the body by any suitable means, such as by screws (not shown). As illustrated, the housing 24 and the mounting plate 35 are provided with co-acting dovetail surfaces 36 and 37 respectively. The housing 24 is mounted on the mounting plate by being pushed downwardly thereover from the top thereof.

I claim:

1. A vehicle rear view mirror mounting structure having a bracket means adapted to be secured to the exterior of a vehicle body, a housing mounted on said bracket means, a mirror containing body member parallelogram support members comprising, a pair of support rods of equal effective length, connecting means articulately connecting one end of each support rod to said body member, mounting means articulately supporting the other end of each support rod at said housing, the effective distance between the points of connection of said support rods to said body member being equal to the effective distance between the points of support thereof at said housing, said mounting means comprising for each rod a ball portion on said other end thereof, each ball portion being substantially contained within said housing and having bearing engagement at the support rod side thereof with the edge of an aperture in the housing wall through which said support rod projects, pressure means coacting with each ball portion, said pressure means comprising ball sockets contained within said housing and in contact with each ball portion on the side thereof opposite said support rod side, a leaf spring contained within said housing, and means swivelly mounting one of said ball sockets at each end of said leaf spring whereby each ball socket will be able to conform to any adjusted position of its coacting ball portion, said leaf spring thereby being able to maintain substantially uniform pressure on said balls whereby the latter will be maintained in frictional tangential contact with said aperture edges and full hemispherical contact with said sockets, said mounting means thereby being effective to maintain said support rods in any adjusted position thereof.

2. A vehicle rear view mirror mounting structure having a bracket means adapted to be secured to the exterior of a vehicle body, a housing mounted on said bracket means, a mirror containing body member, parallelogram support members comprising a pair of support rods of equal effective length, connecting means articulately connecting one end of each support rod to said body member, mounting means articulately supporting the other end of each support rod at said housing, the effective distance between the points of connection of said support rods to said body member being equal to the effective distance between the points of support thereof at said housing, said mounting means comprising for each rod a ball portion on said other end thereof, each ball portion being substantially contained within said housing and having bearing engagement at the support rod side thereof with the edge of an aperture in the housing wall through which the support rod projects, pressure means coacting with each ball portion, said pressure means comprising ball sockets contained within said housing and in contact with each ball portion on the side thereof opposite said support rod side, a leaf spring contained within said housing, means swivelly mounting one of said socket members at each end of said leaf spring whereby each ball socket will be able to conform to any adjusted position of its coacting ball portion, and means mounting said leaf spring within said housing for bodily shiftable movement in the direction of a line connecting said points of support, said leaf spring thereby being able to maintain substantially uniform pressure on said balls whereby the latter will be maintained in frictional tangential contact with said aperture edges and full hemispherical contact with said sockets, said mounting means thereby being effective to maintain said support rods in any adjusted position thereof.

3. A vehicle rear view mirror mounting structure having a bracket means adapted to be secured to the exterior of a vehicle body, a housing mounted on said bracket means, a mirror containing body member, parallelogram support members comprising a pair of support rods of equal effective length, connecting means articulately connecting one end of each support rod to said body member, mounting means articulately supporting the other end of each support rod at said housing, the effective distance between the points of connection of said support rods to said body member being equal to the effective distance between the points of support thereof at said housing, said mounting means comprising for each rod a ball portion on said other end thereof, each ball portion being substantially contained within said housing and having bearing engagement at the support rod side thereof with the edge of an aperture in the housing wall through which the support rod projects, pressure means coacting with each ball portion, said pressure means comprising ball sockets contained within said housing and in contact with each ball portion on the side thereof opposite said support rod side, a leaf spring contained within said housing, means swivelly mounting one of said ball sockets at each end of said leaf spring whereby each ball socket will be able to conform to any adjusted position of its coacting ball portion, and means mounting said leaf spring within said housing for bodily shiftable movement in the direction of a line connecting said points of support, said last mentioned means including a spring tension adjusting means, said leaf spring thereby being able to maintain substantially uniform pre-adjusted pressure on said balls whereby the latter will be maintained in frictional tangential contact with said aperture edges and full hemispherical contact with said sockets, said mounting means thereby being effective to maintain said support rods in any pre-adjusted position thereof.

References Cited in the file of this patent

UNITED STATES PATENTS

| | | |
|---|---|---|
| 589,045 | Temple | Aug. 31, 1897 |
| 641,748 | Smith | Jan. 23, 1900 |
| 980,774 | Halle | Jan. 3, 1911 |
| 1,446,164 | D'Eyraud | Feb. 20, 1923 |
| 2,440,873 | Popp et al. | May 4, 1948 |
| 2,613,575 | Falge | Oct. 14, 1952 |
| 2,629,286 | Budreck | Feb. 24, 1955 |